(No Model.)

A. A. PAGE.
KNOB ATTACHMENT.

No. 539,639. Patented May 21, 1895.

Witnesses,
J. H. Shumway
Lillian D. Kelsey

Albert A. Page
Inventor
By attys
Earle Seymour

UNITED STATES PATENT OFFICE.

ALBERT A. PAGE, OF EAST HAVEN, ASSIGNOR TO THE SARGENT & COMPANY, OF NEW HAVEN, CONNECTICUT.

KNOB ATTACHMENT.

SPECIFICATION forming part of Letters Patent No. 539,639, dated May 21, 1895.

Application filed June 18, 1894. Serial No. 514,923. (No model.)

*To all whom it may concern:*

Be it known that I, ALBERT A. PAGE, of East Haven, in the county of New Haven and State of Connecticut, have invented a new Improvement in Door-Knobs; and I do hereby declare the following, when taken in connection with the accompanying drawings and the letters of reference marked thereon, to be a full, clear, and exact description of the same, and which said drawings constitute part of this specification, and represent, in—

Figure 1:
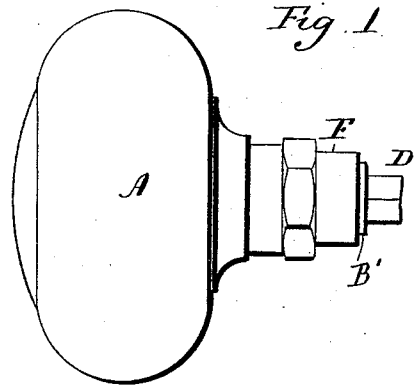
Figure 2:
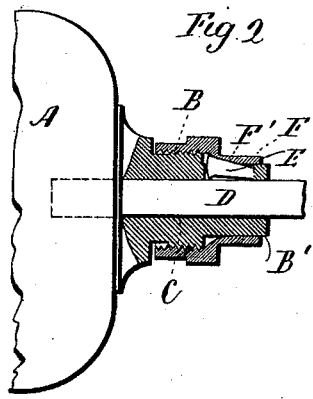
Figure 4:
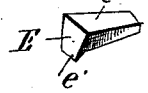
Figure 3:
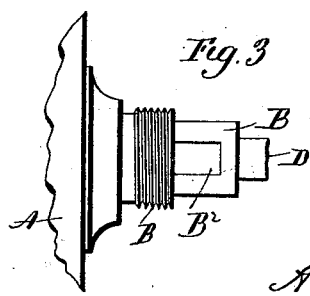

Figure 1, a view, in side elevation, of a knob constructed in accordance with my invention; Fig. 2, a view thereof in vertical central section; Fig. 3, a detached broken view of the knob, showing the radial opening in the hub of the shank thereof; Fig. 4, a detached perspective view of the dog.

My invention relates to an improvement in door-knobs, and more particularly to their adaptation to be attached to spindles, the object being to produce a simple and effective construction, composed of few parts, and adapted to permit the secure attachment of the knobs to the spindle at any point upon the latter.

With these ends in view my invention consists in certain details of construction and combinations of parts, as will be hereinafter described and particularly pointed out in the claim.

As herein shown, the knob A, is constructed with a shank comprising an externally threaded shoulder B, and a smooth cylindrical hub B', smaller in diameter than the said shoulder, and furnished with a radial slot or opening B² which intersects the square longitudinal opening C, extending throughout the length of the shank and into the knob, and receiving the squared spindle D, which is of the usual construction. In the radial opening B² I locate a detached dog E, tapering in general form, and having a beveled outer face *e*, and a sharp tooth *e'* depending from its inner end. This dog, which is by preference formed of hardened steel, is confined against lateral or endwise play in the radial opening, and rests directly upon the spindle, against which it is forced by means of a clamping-sleeve F, constructed at its inner end with internal screw-threads, adapting it to take into the threads of the shoulder B of the shank, and adapted at its outer end to fit over the hub of the said shank. Between its ends the said sleeve is by preference provided with flat faces in the similitude of a nut for the application of a wrench in turning the sleeve. When the sleeve is turned inward, it engages with the beveled outer face of the dog, and thus crowds the same down upon the spindle, whereby the dog is caused to bite into the spindle with such force that the same is firmly held against endwise movement in the shank of the knob.

As herein shown, the sleeve is constructed with an internal annular bevel F' for engaging with the dog, but that is not essential, for any adaptation of the sleeve to engage with the outer face of the dog so as to crowd the same inward will answer the purpose of my invention.

It will be readily apparent that by means of my improved construction, I am enabled to secure very close adjustments of the knob with reference to the spindle, as the dog will bite into the spindle anywhere, whereas in prior constructions in which the spindle has been provided with notches or holes, the fineness of its adjustment has been limited to the spaces between the same.

It is apparent that in carrying out my invention, the particular form of the shank, dog, and sleeve may be somewhat varied, and I would therefore have it understood that I do not limit myself to the exact construction herein shown and described, but hold myself at liberty to make such changes and alterations as fairly fall within the spirit and scope of my invention. I am aware, however, that it is not new to provide a door-knob with a clamping device constructed and arranged to grip the spindle at any desired point thereon for securing the knob to the spindle, and I do not claim such construction broadly.

Having fully described my invention, what I claim as new, and desire to secure by Letters Patent, is—

The combination with a door-knob provided with a shank having an externally threaded shoulder B, and constructed with a central longitudinal opening, and with a radial opening leading outward from the said longitudinal opening through the shank; of a spindle entered into the longitudinal opening of the shank, a loose or detached dog having a sharp tooth depending from its inner end, the said dog being confined against lateral and longitudinal movement by the walls of the radial opening and resting upon the spindle, and a sleeve applied to the shank and engaged with the threaded shoulder thereof, and adapted to force the dog downward upon the spindle into which the dog bites so as to firmly connect the spindle and shank, substantially as described.

In testimony whereof I have signed this specification in the presence of two subscribing witnesses.

ALBERT A. PAGE.

Witnesses:
ELLIOTT LITTLEJOHN,
WILLIAM T. COOK.